United States Patent [19]
Chi

[11] Patent Number: 5,251,995
[45] Date of Patent: Oct. 12, 1993

[54] COUPLING OF A HEAD SET

[76] Inventor: Yi C. Chi, No. 139-5, An Mei Rd., Mei Shan Village, Hou Li Hsiang, Taichung Hsien, Taiwan

[21] Appl. No.: 975,623

[22] Filed: Nov. 12, 1992

[51] Int. Cl.⁵ .......................................... B62K 21/00
[52] U.S. Cl. .................................. 403/320; 403/315; 403/362; 403/373; 280/279; 74/551.1
[58] Field of Search ............... 403/315, 316, 320, 362, 403/373, 359, 21; 280/279; 74/551.1

[56] References Cited

U.S. PATENT DOCUMENTS

| | | | |
|---|---|---|---|
| 258,794 | 5/1882 | Moss | 403/362 |
| 1,125,045 | 1/1915 | Beck | 403/362 |
| 1,213,492 | 1/1917 | Hughes | 403/316 |
| 1,493,550 | 5/1924 | Keller | 403/320 |
| 1,534,916 | 4/1925 | Campbell | 403/320 |
| 1,799,806 | 4/1931 | Thomsen | 280/279 |
| 4,436,468 | 3/1984 | Ozaki | 403/362 |
| 4,531,756 | 7/1985 | Mori | 280/279 |
| 4,593,924 | 6/1986 | Cabeza | 280/279 |
| 4,960,342 | 10/1990 | Chi | 403/320 |
| 5,163,758 | 11/1992 | Chi | 280/279 |

Primary Examiner—Randolph A. Reese
Assistant Examiner—Anthony Knight
Attorney, Agent, or Firm—Ware, Fressola, Van Der Sluys & Adolphson

[57] ABSTRACT

A head set includes a sleeve threadedly engaged on a steerer tube, a ratchet gear engaged on the steerer tube and including a key extended radially inwards for engagement with the steerer tube, and a compression nut threadedly engaged on the steerer tube in order to compress the ratchet gear in place. The compression nut includes a screw threadedly engaged in a screw hole for engagement with the ratchet gear so that the compression nut is prevented from rotating in a reverse direction relative to the steerer tube.

1 Claim, 4 Drawing Sheets

COUPLING OF A HEAD SET

BACKGROUND OF THE INVENTION

1. Field of the Invention

The present invention relates to a coupling of a head set, and more particularly to a coupling of a head set of a bicycle.

2. Description of the Prior Art

A typical coupling of the head set of a bicycle is shown in FIGS. 4 and 5 and comprises a compression nut 60 engaged on a steerer tube 70, the compression nut 60 includes a pair of slits 61 formed in parallel therein and a cut 66 formed therein and communicated with the slits 61 so that a resilient arm 62 is formed, a screw hole 64 formed in the free end portion of the arm 62, and a depression 63 formed in the other side of the cut 66 opposite to the free end portion of the arm 62, and a bolt 65 threaded through the depression 63 and the screw hole 64 such that the arm 62 can be caused to move radially inwards of the compression nut 60 in order to compress the steerer tube 70, whereby, the compression nut 60 is stably fixed to the steerer tube 70. However, it is very difficult to machine the slits 61, the cut 66, the depression 63 and the screw hole 64 such that the manufacturing cost is greatly increased.

The present invention has arisen to mitigate and/or obviate the afore-described disadvantages of the conventional head sets.

SUMMARY OF THE INVENTION

The primary objective of the present invention is to provide a coupling of a head set which can be easily manufactured.

In accordance with one aspect of the invention, there is provided a head set comprising a steerer tube including an outer thread formed in an upper and outer portion thereof and a groove longitudinally formed in the upper and outer portion thereof, a sleeve threadedly engaged on the steerer tube, a ratchet gear engaged on the steerer tube and including a key extended radially inwards for engagement with the groove of the steerer tube, and a compression nut threadedly engaged on the steerer tube and engaged on the ratchet gear in order to compress the ratchet gear in place when the compression nut is rotated in an active direction, the compression nut including an annular shoulder formed in an inner and lower portion thereof for accommodating the ratchet gear, and a screw hole formed therein and communicated with the annular shoulder, and a screw threaded in the screw hole of the compression nut for engagement with the ratchet gear received in the annular shoulder, whereby, the compression nut is prevented from rotating in a reverse direction relative to the steerer tube.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
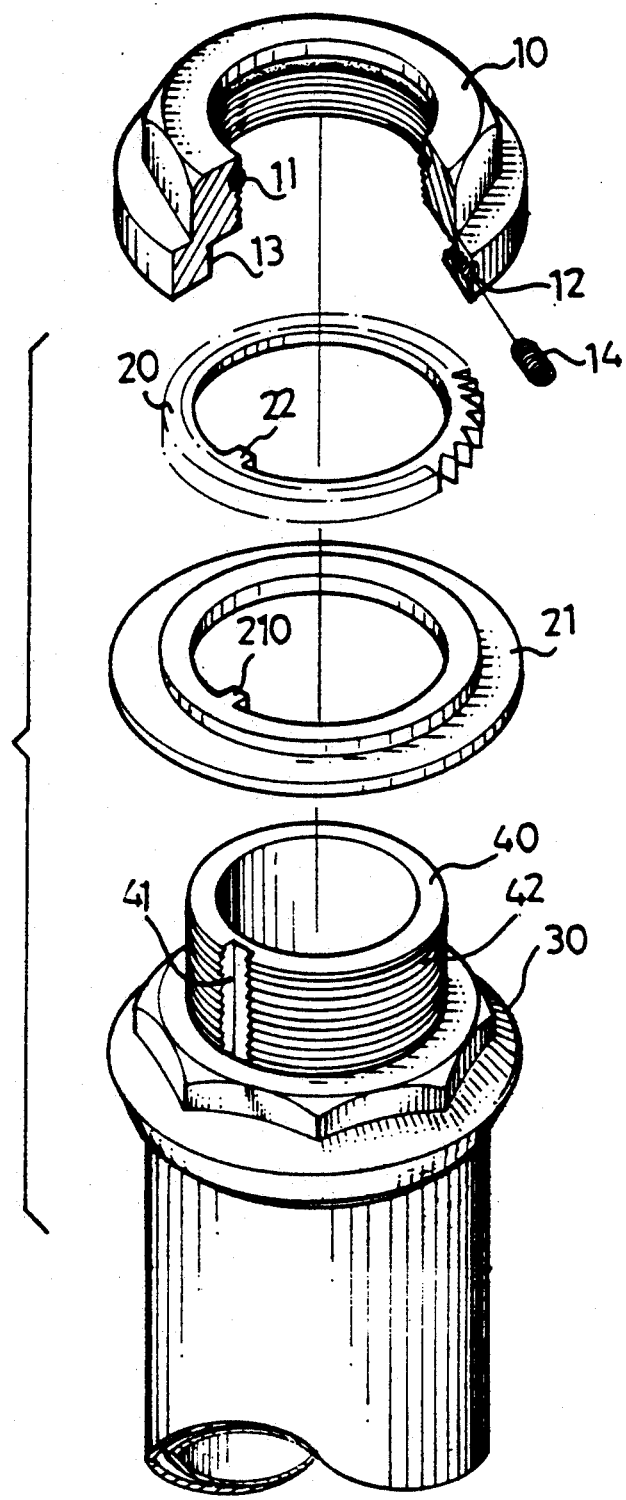
FIG. 1 is an exploded view of a coupling of a head set in accordance with the present invention.
Figure 2:
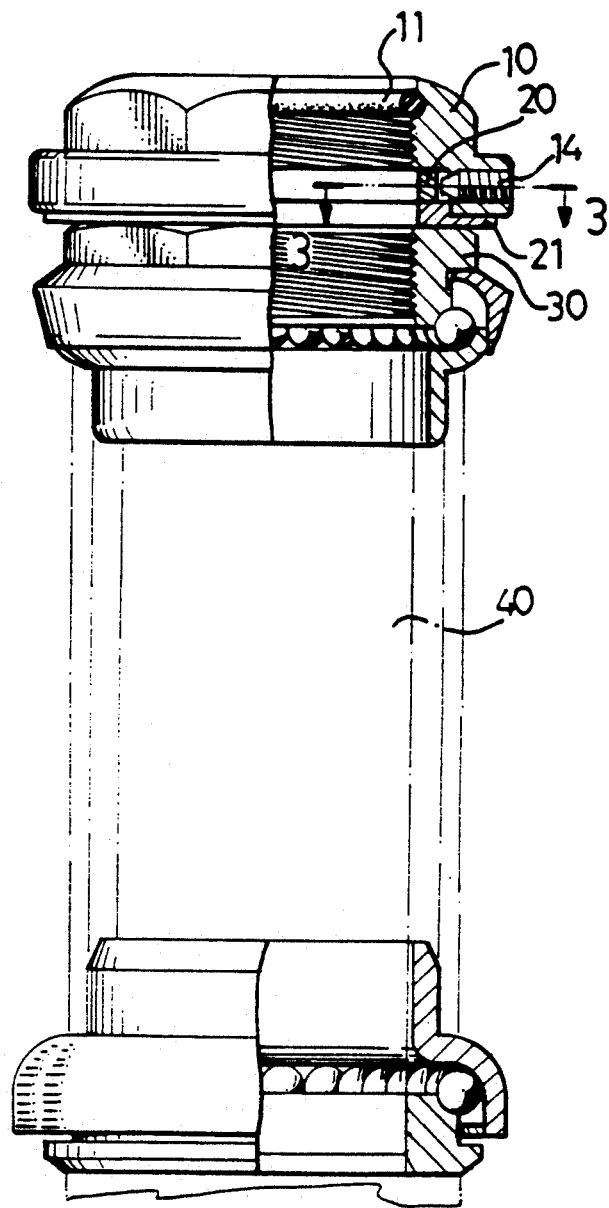
FIG. 2 is a cross sectional view of the coupling of the head set.
Figure 3:
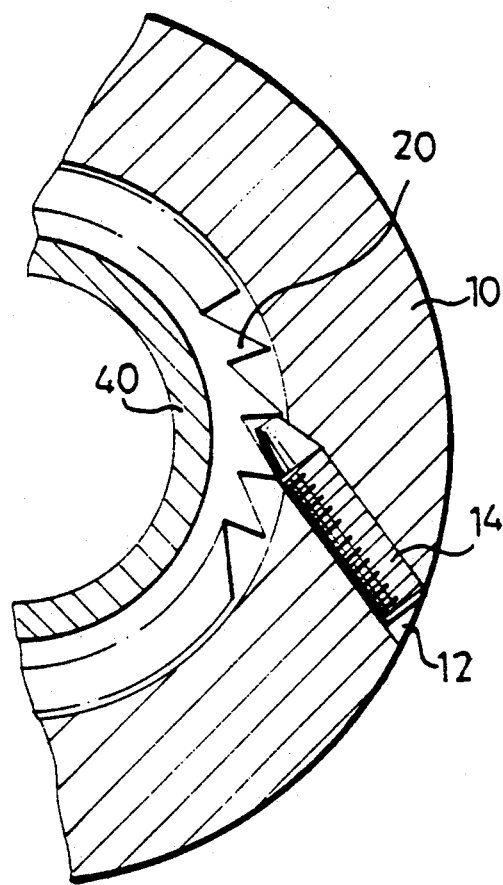
FIG. 3 is a partial cross sectional view taken along lines 3—3 of FIG. 2.
Figures 4, 5:
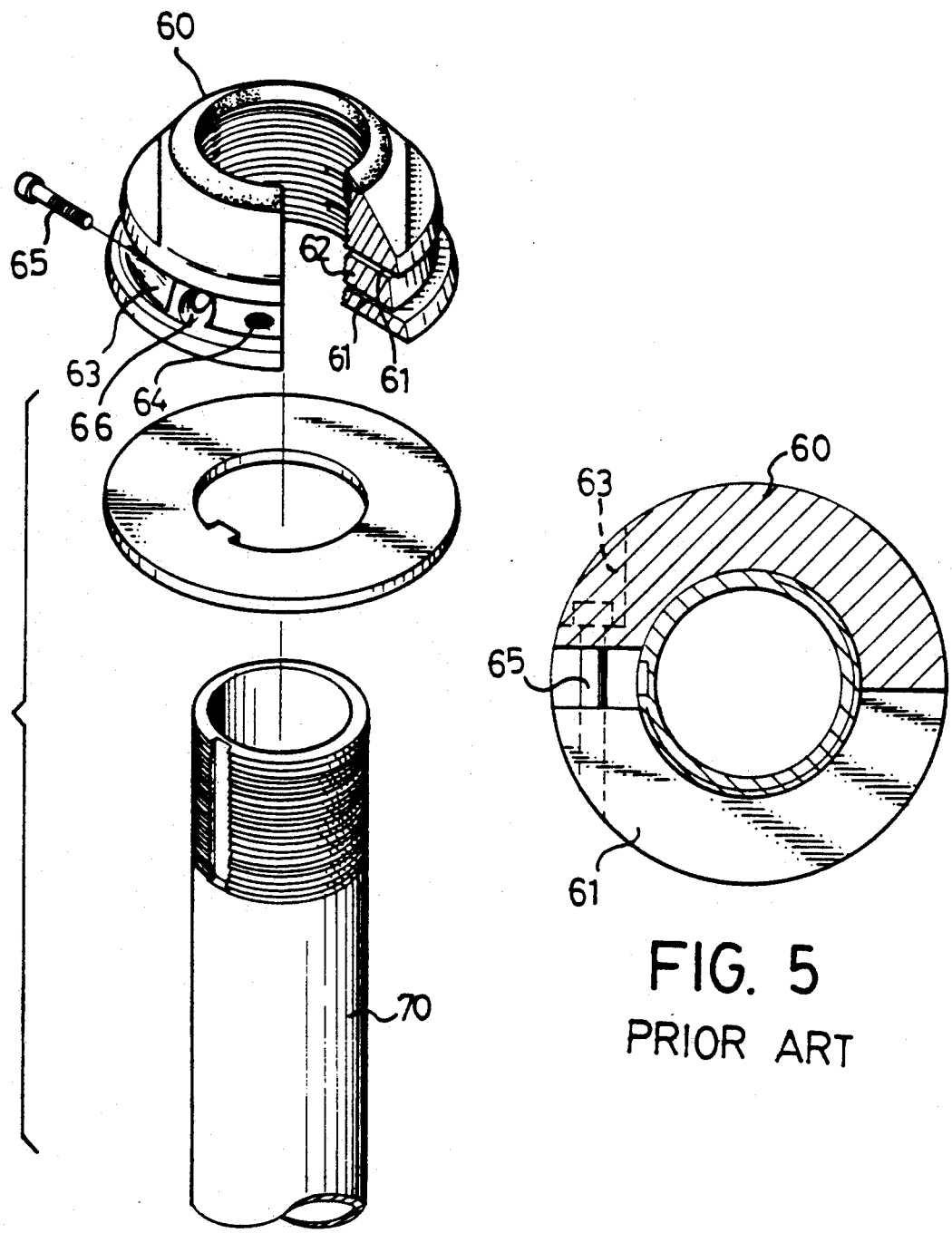
FIG. 4 is an exploded view of a typical coupling of a head set.
FIG. 5 is a cross sectional view of the typical coupling of the head set.

Referring to the drawings, and initially to FIGS. 1 and 2, a coupling of a head set in accordance with the present invention comprises a sleeve 30 threaded on the upper end portion of a steerer tube 40 of a bicycle, the steerer tube 40 including an outer thread 42 formed in the upper portion thereof and a groove 41 longitudinally formed in the upper and outer portion thereof, a washer 21 engaged on the steerer tube 40 and including a protrusion 210 extended radially inwards for engagement with the groove 41 of the steerer tube 40 such that the washer 21 is prevented from rotating relative to the steerer tube 40, a ratchet gear 20 engaged on the steerer tube 40 and engaged on the washer 21 and including a key 22 extended radially inwards for engagement with the groove 41 of the steerer tube 40, and a compression nut 10 threaded engaged with the outer thread 42 of the steerer tube 40 and including a sealing ring 11 engaged in an upper and inner portion thereof for making a water tight seal with the steerer tube 40 and including an annular shoulder 13 formed in an inner and lower portion for accommodating the ratchet gear 20, a screw hole 12 formed in the lower portion of the compression nut 10 and communicated with the annular shoulder 13, and a screw 14 threadedly engaged in the screw hole 12.

In operation, the compression nut 10 is threaded on the steerer tube 40 in an active direction so as to compress the washer 21 and the ratchet gear 20 in place; the screw 14 is then further threaded into the screw hole 12 for engagement with the ratchet gear 20 so that the compression nut 10 is prevented from rotating in a reverse direction and so that the parts can be stably coupled in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A head set comprising a steerer tube including an outer thread formed in an upper and outer portion thereof and a groove longitudinally formed in said upper and outer portion thereof, a sleeve threadedly engaged on said steerer tube, a ratchet gear engaged on said steerer tube and including a key extended radially inwards for engagement with said groove of said steerer tube, and a compression nut threadedly engaged on said steerer tube and engaged on said ratchet gear in order to compress said ratchet gear in place when said compression nut is rotated in an active direction, said compression nut including an annular shoulder formed in an inner and lower portion thereof for accommodating said ratchet gear, and a screw hole formed therein and communicated with said annular shoulder, and a screw threaded in said screw hole of said compression nut for engagement with said ratchet gear received in said annular shoulder, whereby, said compression nut is prevented from rotating in a reverse direction relative to the steerer tube.

* * * * *